May 23, 1950     A. F. WELLING     2,508,847
QUICK DETACHABLE LINK FOR OPEN LINK CHAINS
Filed Dec. 23, 1948
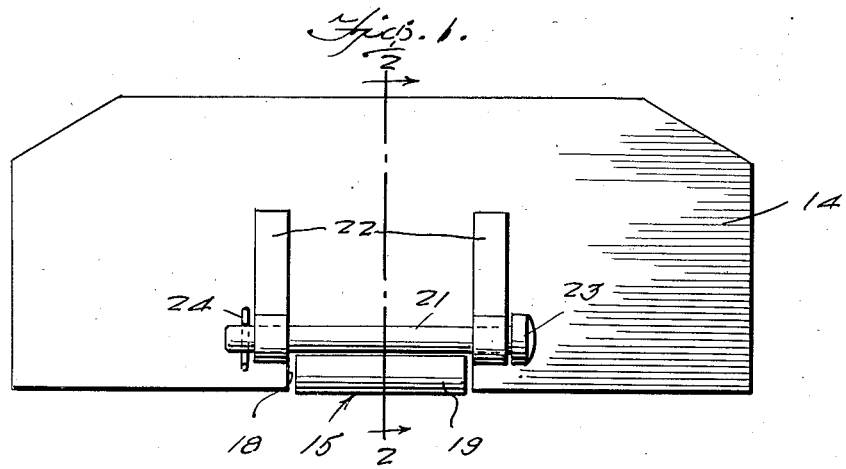
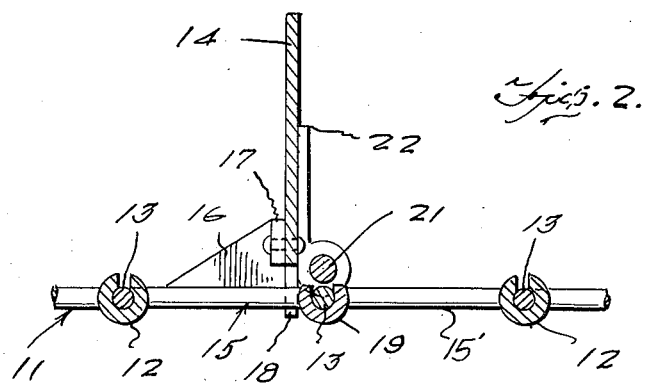
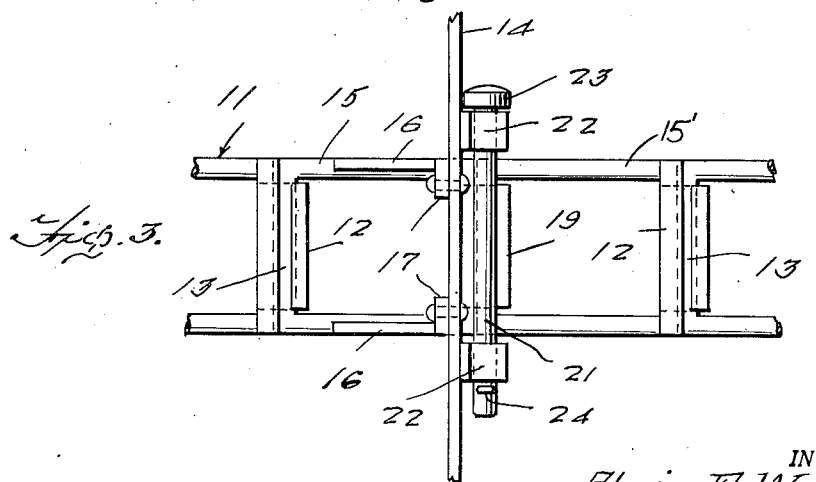
INVENTOR.
Alwin F. Welling
BY
McMorrow, Berman & Davidson
ATTORNEYS Patented May 23, 1950

2,508,847

UNITED STATES PATENT OFFICE 2,508,847

QUICK DETACHABLE LINK FOR OPEN LINK CHAINS

Alwin F. Welling, Millbury, Ohio

Application December 23, 1948, Serial No. 66,873

2 Claims. (Cl. 198—176)

This invention relates to detachable link connections for chains, and more particularly to detachable link connections for chain conveyor belts, such as the chain conveyor belts used on corn pickers, and other agricultural machines.

A main object of the invention is to provide a novel and improved connection for adjacent links of open conveyor chain, enabling the chain to be readily taken apart whenever required, and to be readily reconnected.

A further object of the invention is to provide an improved detachable link connection for conveyor chains and the like, which is simple in construction, easy to manipulate and compact in size.

Further objects and advantages of the invention will become apparent from the following description and claims, and from the accompanying drawings, wherein Figure 1 is a front elevational view of a conveyor chain link and paddle provided with elements of the improved link connection of the present invention.

Figure 2 is a longitudinal cross-sectional view taken on line 2—2 of Figure 1 and showing an adjacent link connected to the link of Figure 1.

Figure 3 is a top plan view of the link connection shown in Figure 2.

Referring to the drawings, 11 generally designates an open-link conveyor chain, such as is employed in corn pickers and other agricultural machines. As shown in Figure 2, each link is normally provided at one end with a transverse sleeve element 12 which rotatably receives the transverse bar element 13 of the next link. At spaced points on chain 11, transverse paddles 14 are secured to the links, for example, to the link 15, shown in Figure 2. The paddle 14 is rigidly secured to the link 15 at right angles thereto by means of triangular brackets 16 projecting upwardly from the side elements of link 15 and formed with inturned lugs 17, 17 which are riveted to the paddle 14. The midportion of the lower margin of paddle 14 is notched out, as shown at 18, to provide clearance for the teeth of the sprocket wheels over which the chain passes.

As shown in Figure 2, paddle 14 is located rearwardly adjacent the transverse end sleeve 19 of link 15. Sleeve 19 is channel-shaped and normally receives the transverse bar element 13 of the next link 15' of the chain. Whereas the sleeves 12 of the other links receive the bar elements 13 and almost completely surround said bar elements so that they cannot be separated therefrom, the sleeve 19 is formed to allow its bar element 13 to be lifted out of engagement therewith. However, said latter bar element 13 is normally restrained against upward removal from sleeve 19 by a transverse pin 21 which overlies the bar element 13, as shown in Figure 2. Pin 21 is carried in a pair of apertured brackets 22, 22, secured to paddle 14 outwardly adjacent opposite ends of sleeve 19, the pin having a head 23 at one end and being provided with a cotter pin 24 at its other end. To disconnect link 15' from link 15, the cotter pin 24 is removed and pin 21 is slipped endwise out of the brackets 22. The end bar element 13 of link 21 may then be lifted out of sleeve 19. The links 15 and 15' are reconnected by a reverse procedure.

It is thus apparent that the chain may be readily taken apart and reconnected whenever desired without detaching any other parts of the machine. A plurality of detachable link connections such as shown in Figures 2 and 3 may be employed in the conveyor chain if so desired.

While a specific embodiment of a detachable link connection for conveyor chains has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a chain conveyor a first link formed at one end with a transverse channelled sleeve, a paddle member transversely secured to said first link adjacent said sleeve, a second link having a bar element received in said sleeve and being upwardly disengageable therefrom, bracket means adjacent said sleeve and carried by said paddle member, and a pin member removably secured in said bracket means in overlying relation to said bar element.

2. In a chain conveyor, a first link formed at one end with a transverse upwardly facing channelled sleeve, a paddle member transversely secured to said first link adjacent said sleeve, a second link having a bar element received in said sleeve and being upwardly disengageable therefrom, a pair of bracket members secured to said paddle member outwardly adjacent the respective ends of said sleeve, and a pin member removably secured in said bracket members in overlying relation to said bar element.

ALWIN F. WELLING.

REFERENCES CITED

The following references are of record in the file of this patent:

UNITED STATES PATENTS

| Number | Name | Date |
|---|---|---|
| 258,863 | McKernan | May 30, 1882 |
| 1,638,267 | Morehead et al. | Aug. 9, 1927 |
| 2,317,769 | Holmes | Apr. 27, 1943 |